United States Patent
Waylor et al.

(10) Patent No.: US 9,345,251 B2
(45) Date of Patent: May 24, 2016

(54) FOOD FRYER

(71) Applicants: Lisa M. Waylor, North Augusta, SC (US); Tina M. Griffith, Hephzibah, GA (US); Timothy A. Thomas, North Augusta, SC (US)

(72) Inventors: Lisa M. Waylor, North Augusta, SC (US); Tina M. Griffith, Hephzibah, GA (US); Timothy A. Thomas, North Augusta, SC (US)

( * ) Notice: Subject to any disclaimer, the term of this patent is extended or adjusted under 35 U.S.C. 154(b) by 0 days.

(21) Appl. No.: 14/272,655

(22) Filed: May 8, 2014

(65) Prior Publication Data
US 2015/0196164 A1    Jul. 16, 2015

Related U.S. Application Data

(60) Provisional application No. 61/926,694, filed on Jan. 13, 2014.

(51) Int. Cl.
*A47J 37/12*    (2006.01)
*A23L 1/01*    (2006.01)

(52) U.S. Cl.
CPC ........... *A23L 1/0114* (2013.01); *A47J 37/1242* (2013.01)

(58) Field of Classification Search
CPC .... A32B 5/08; A47J 37/1214; A47J 37/1242; A47J 37/12; A47J 37/1204; A47J 37/129; A23L 1/0114
USPC ............................................. 426/438; 99/404
See application file for complete search history.

(56) References Cited

U.S. PATENT DOCUMENTS

| | | | | |
|---|---|---|---|---|
| 2,853,937 A * | 9/1958 | Peck | ................. | 99/404 |
| 3,614,924 A * | 10/1971 | Hickey | ............... | 99/404 |
| 3,637,401 A * | 1/1972 | Kuhlman | ....... | 426/296 |
| 3,641,923 A * | 2/1972 | Wilkinson | ....... | 99/404 |
| 3,761,290 A * | 9/1973 | Brunner | ........... | 99/330 |
| 3,826,184 A * | 7/1974 | Shotton, Jr. | ...... | 99/404 |
| 3,905,285 A * | 9/1975 | Campbell et al. | ...... | 99/353 |
| 4,685,386 A * | 8/1987 | Bezon | ............... | 99/404 |
| 5,247,875 A * | 9/1993 | Shimizu | ........... | 99/404 |

FOREIGN PATENT DOCUMENTS

EP    0470314 A1 *    2/1992    .......... G07F 17/0078

* cited by examiner

*Primary Examiner* — Steven Leff
(74) *Attorney, Agent, or Firm* — Charlena Thorpe, Esq.; Incorporating Innovation with Charlena Thorpe

(57) ABSTRACT

Implementations of a food fryer are provided. In some implementations, the food fryer comprises a body portion, a stand, burners, and a drain. In some implementations, the body portion of the food fryer may be a curved hollow tube having an opening on each end. The body portion is configured to hold liquids therein for the purpose of frying or cooking food. In some implementations, the food fryer may include a storage container comprised of a body portion, a lid, and two extension members. In some implementations, the two extension members of the storage container may be configured to individually or collectively secure about the openings of the food fryers body portion such that the storage container is positioned above the food fryer. In some implementations, the storage container comprises openings from which the extension members extend.

3 Claims, 2 Drawing Sheets

FOOD FRYER

CROSS REFERENCE TO RELATED APPLICATION

This application claims the benefit of U.S. Patent Application Ser. No. 61/926,694, which was filed on Jan. 13, 2014, and is incorporated herein by reference in its entirety.

TECHNICAL FIELD

This disclosure relates to implementations of a food fryer.

BACKGROUND

Frying is a technique of cooking food using oil. Through frying, food is rapidly cooked, resulting in a characteristic crispness and texture. Frying also results in the oil penetrating the food to varying degrees adding its own flavor.

U.S. Pat. No. 5,247,875 ("'875 patent") discloses a compact food frying machine. The compact food frying machine is comprised of a vertically-oriented U-shaped pan for holding heated liquid, an endless belt for carrying food items, guiding elements, a feeding position and an unloading position. The '875 patent discloses that the endless belt is driven by pulley wheels that are operably connected to a motor through a drive belt.

However, the compact food frying machine disclosed in the '875 patent has several disadvantages. First, manufacturing a machine with so many mechanical components may increase the cost. Second, it is relatively complex in construction and/or operation. Third, with so many mechanical parts the operation cost may increase due to scheduled and non-scheduled maintenance requirements. Fourth, it may be more prone to operational failure than a non-mechanized food fryer.

DETAILED DESCRIPTION

Implementations of a food fryer are provided. In some implementations, the food fryer comprises a body portion, a stand, burners, and a drain. In some implementations, the body portion of the food fryer may be a hollow tube having an opening on each end. The body portion is configured to hold liquids therein for the purpose of frying or cooking food. In some implementations, the body portion may be curved. In some implementations, the body portion may have a generally "U" shape. In some implementations, the body portion can be made from metal.

In some implementations, the food fryer may include a storage container. In some implementations, the storage container may be comprised of a body portion, a lid, and two extension members.

In some implementations, the two extension members of the storage container may be configured to secure about the openings of the food fryers body portion such that the storage container is positioned above the food fryer. In some implementations, the storage container comprises openings from which the extension members extend. When placed on top of the food fryer, the storage container may be used to position food for insertion into the food fryer, to store food extracted from the food fryer, to collect excess oil which may splatter, or otherwise become dislodged from the food fryer, or to prevent contamination of the body portions contents, for example.

In some implementations, only one extension member may be secured about an opening of the food fryers body portion such that the storage container is positioned on a side of the food fryer.

In some implementations, a storage container can be positioned on both sides of the food fryer and secured about the openings of the food fryer, respectively.

To use the food fryer to fry food, the body portion is filled with oil to a suitable level, and the burners ignited. Once the oil has reached a predetermined frying temperature, food suitable for frying may be inserted into a first opening of the body portion. After the food is inserted into the first opening, the food initially sinks to the low point of the body portion where it continues frying. As the food continues frying and thereby heating up, the food begins to slowly rise to a second opening of the body portion. At this point, a user may extract the fried food from the second opening of the food fryer.

Figure 1:
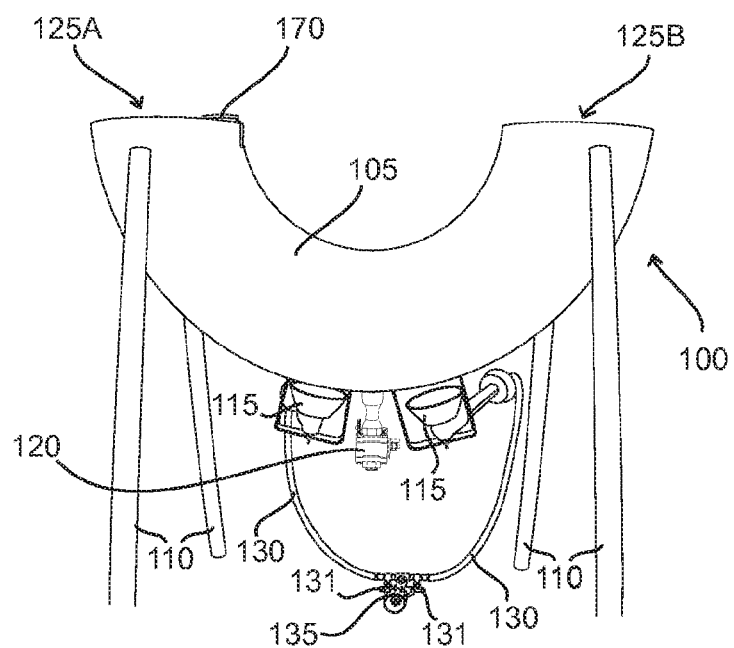
FIG. 1 illustrates an example food fryer according to the present disclosure.

FIG. 1 illustrates an example food fryer 100 according to the present disclosure.

As shown in FIG. 1, in some implementations, the food fryer 100 comprises a body portion 105, a stand 110, burners 115, and a drain 120.

In some implementations, the body portion 105 of the food fryer 100 may be a hollow tube having an opening 125A,B (referred to as openings 125 collectively) at each end. The body portion 105 is configured to hold liquids therein for the purpose of frying or cooking food. In some implementations, the body portion 105 may be curved. In some implementations, the body portion 105 may have two openings (e.g., openings 125A,B) that are elevated above a low point in the tube (see, e.g., FIG. 1). In some implementations, the body portion 105 may have a generally "U" shape. In some implementations, the body portion 105 may have a generally semi-circular shape. In some implementations, the body portion 105 can be made from metal. In some implementations, the body portion 105 can be manufactured from any material suitable for use with high heat and hot liquids.

In some implementations, a drain 120 may be attached to the body portion 105 of the food fryer 100. In some implementations, the drain 120 may be attached to the lowest point of the body portion 105 (see, e.g. FIG. 1). In some implementations, the drain 120 may be constructed to control when to allow the liquid contents of the food fryer 100 to empty out.

In some implementations, a stand 110 may be provided to support the body portion 105 of the food fryer 100. In some implementations, the stand 110 may be comprised of four legs. In some implementations, the legs of the stand 110 may be welded to the body portion 105. In some implementations, the legs of the stand 110 may be attached to the body portion 110 of the food fryer 100 by any suitable means currently know, or developed in the future. In some implementations, the stand 110 may be made from metal. In some implementations, the stand 110 may be manufactured from any suitable material.

In some implementations, two or more burners 115 may be attached to the body portion 105 of the food fryer 100 (see, e.g., FIG. 1). In some implementations, only a single burner 115 may be attached to the body portion 105.

In some implementations, each burner 115 may have a hose 130 connected thereto, respectively. In some implementations, each hose 130 may be operably connected to a valve 135 configured for attachment to a propane tank. In some implementations, the valve 135 can be configured for attachment to any suitable energy source, e.g., a liquid or gas. In some implementations, each hose 130 may be attached to a second valve 131, and each of the second valves 131 may be connected to the valve 135. In some implementations, each of the second valves 131 may be configured to serve as a shut off. In some implementations, multiple hoses 130 may be operably connected to a single valve 135 (see, e.g., FIG. 1).

To use the food fryer 100 to fry food, the body portion 105 is filled with oil to a suitable level, and the burners 115 are ignited. Once the oil has reached a predetermined frying temperature, food suitable for frying may be inserted into a first opening (e.g., opening 125A) of the body portion 105. After the food is inserted into the first opening, the food initially sinks to the low point of the body portion 105 where it continues frying. As the food continues frying and thereby heating up, the food begins to slowly rise to a second opening (e.g., opening 125B) of the body portion 105. At this point, a user may extract the fried food from the second opening of the food fryer 100.

In some implementations, the food fryer 100 may be used to cook fish. In some implementations, the food fryer 100 may be used to cook beef, poultry or other meat suitable for human consumption. In some implementations, the food fryer 100 may be used to cook any suitable food item.

In some implementations of the food fryer 100, a thermometer 170 may be used to check the temperature of the oil. In some implementations, the thermometer 170 may have a probe that is 12" long. In some implementations, the thermometer 170 probe may be longer or shorter than 12" long. In some implementations, the thermometer 170 may be secured about an opening 125 of the body portion 105 (see, e.g., FIG. 1).

In some implementations, a decal, or other indicia, may be used to designate one of the food fryers 100 openings 125 for food insertion and the other opening 125 for food extraction.

Figure 2A:
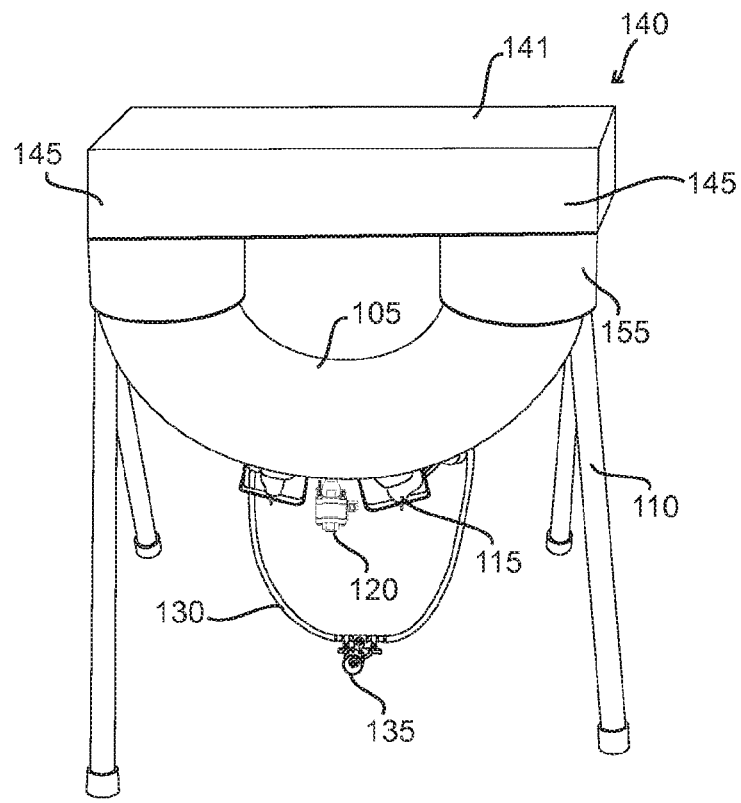
FIGS. 2A-2C illustrate an example storage container according to the present disclosure that may be used with implementations of the food fryer.
Figure 2B:
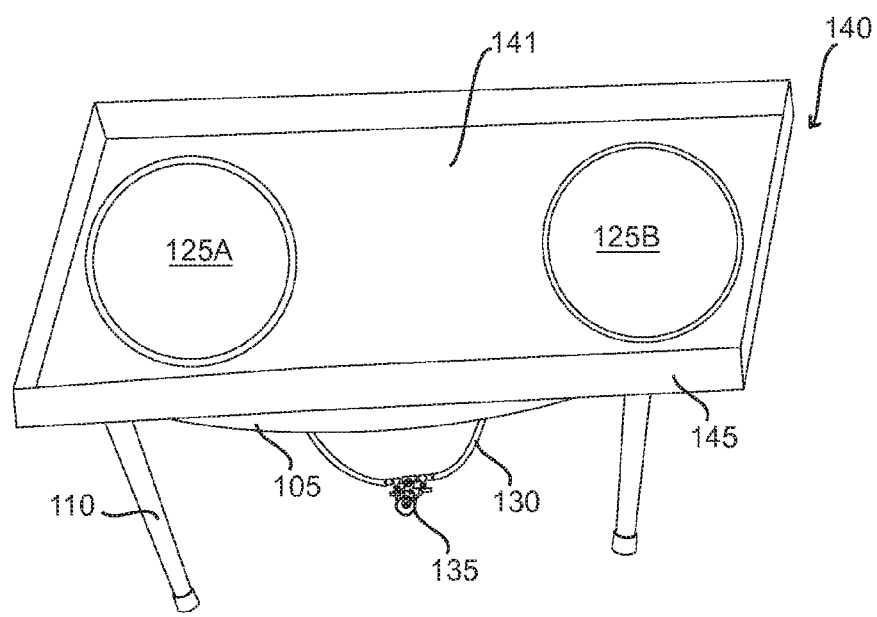
Figure 2C:
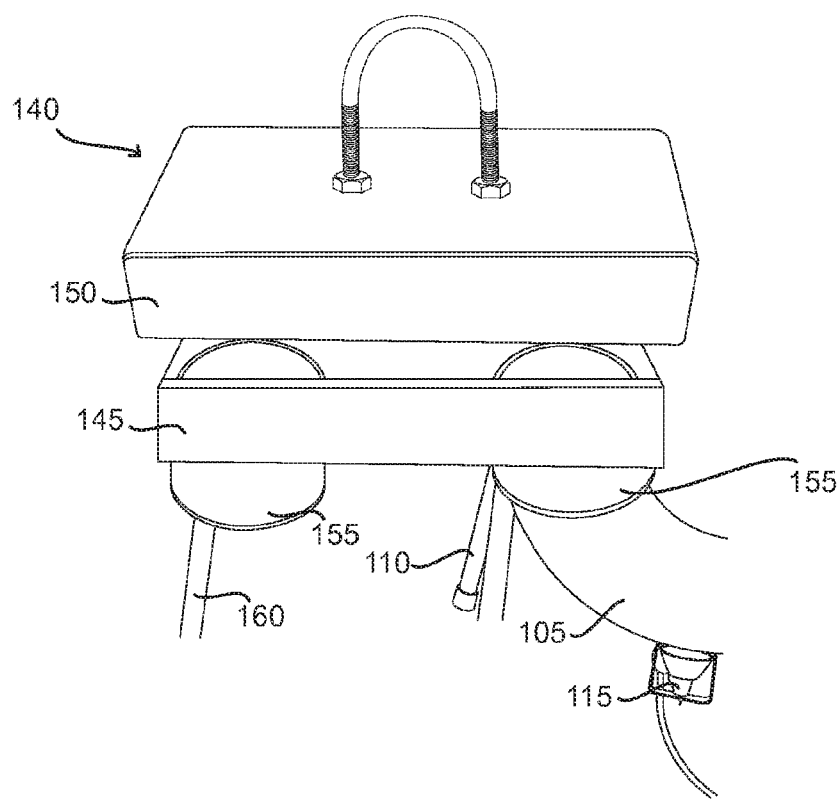

As shown in FIGS. 2A-2C, in some implementations, the food fryer 100 may include a storage container 140. In some implementations, the storage container 140 may be comprised of body portion 145, a lid 150, and two extension members 155.

In some implementations, the two extension members 155 of the storage container 140 may be configured to secure about the openings 125 of the food fryers 100 body portion 105 such that the storage container 140 is positioned above the food fryer 100 (see, e.g., FIG. 2A). In some implementations, the storage container 140 comprises openings (see, e.g., FIG. 2B) from which the extension members 155 extend. In this way, when the storage container 140 is placed on top of the food fryer 100, the storage container 140 may be used to position food for insertion into the food fryer 100, to store food (e.g., in storage area 141) extracted from the food fryer 100, to collect excess oil which may splatter, or otherwise become dislodged from the food fryer 100, or to prevent contamination of the body portions 105 contents, for example.

In some implementations, only one extension member 155 may be secured about an opening 125 of the food fryers 100 body portion 105 such that the storage container 140 is positioned on a side of the food fryer 100 (see, e.g. FIG. 2C). For example, only one extension member 155 may be secured about a first opening 125A of the food fryers 100 body portion 105 for insertion of food to be fried. In this way, the storage container 140 may be used to store food until ready for insertion into the fryer 100 and position food for insertion into the food fryer 100. In some implementations, a portion of the storage container 140 may be supported by a stand 160 (see, e.g., FIG. 2C).

As another example, only one extension member 155 may be secured about a second opening 125B of the food fryers 100 body portion 105 for extraction of the fried food. In this way, the storage container 140 may be used to store food extracted from the food fryer 100.

In some implementations, a storage container can be positioned on both sides of the food fryer 100 and secured about the openings 125A, 125B of the food fryer 100, respectively (see, e.g., FIG. 2A).

Reference throughout this specification to "an embodiment" or "implementation" or words of similar import means that a particular described feature, structure, or characteristic is included in at least one embodiment of the present invention. Thus, the phrase "in some implementations" or a phrase of similar import in various places throughout this specification does not necessarily refer to the same embodiment.

Many modifications and other embodiments of the inventions set forth herein will come to mind to one skilled in the art to which these inventions pertain having the benefit of the teachings presented in the foregoing descriptions and the associated drawings.

The described features, structures, or characteristics may be combined in any suitable manner in one or more embodiments. In the above description, numerous specific details are provided for a thorough understanding of embodiments of the invention. One skilled in the relevant art will recognize, however, that embodiments of the invention can be practiced without one or more of the specific details, or with other methods, components, materials, etc. In other instances, well-known structures, materials, or operations may not be shown or described in detail.

While operations are depicted in the drawings in a particular order, this should not be understood as requiring that such operations be performed in the particular order shown or in sequential order, or that all illustrated operations be performed, to achieve desirable results.

The invention claimed is:

1. A method of cooking using a food fryer wherein the food fryer comprises a first opening: a second opening; a curved hollow tube, and at least one burner, wherein the at least one burner is configured to heat at least a portion of the curved hollow tube, wherein the curved hollow tube is configured to hold a liquid and configured to convey an item placed in the curved hollow tube along a path of the curved hollow tube, wherein the first opening is configured to receive an item to be conveyed through the curved hollow tube and the second opening is configured such that the item can be removed from the food fry after the item has traveled from the first opening through the curved hollow tube toward the second opening, wherein the first opening is located at a first end of the curved hollow tube and the second opening is located at a second end of the curved hollow tube, and wherein the first opening and the second opening are elevated above a low point in the curved hollow tube and the first opening and second opening are on opposite sides of the low point of the curved hollow tube, wherein the food fryer further comprises a storage container comprising four side walls and a bottom side to define a storage area wherein the bottom side comprises a first opening and second opening therethrough wherein the storage container further comprises a first extension portion and a second extension portion extending from the bottom side around the first opening and second opening respectively and away from the storage area wherein the first extension portion and second extension portion are configured to secure about the first opening and the second opening of the food fryer respectively such that the storage area is above the curved hollow tube, the method comprising:

placing oil in the curved hollow tube and heating the oil;

placing a food item into the first opening of the food fryer until the food item sinks to a low point of the curved hollow tube and rises towards the second opening of the body portion;

extracting the food item from the food fryer from the second opening of the food fryer after the food item has traveled through a portion of the curved hollow tube toward the second opening;

placing the first extension portion of the storage container about the first opening of the food fryer prior to placing a food item into the first opening of the food fryer; and placing the second extension portion of the storage container about a second opening of the food fryer prior to extracting the food item from the second opening of the food fryer.

2. The method of claim 1 further comprising positioning food within the storage container prior to placing a food item into the first opening of the food fryer.

3. The method of claim 1 further comprising positioning food within the storage container after extracting the food item from the second opening of the food fryer.

* * * * *